United States Patent

Vazzano

[15] 3,650,539

[45] Mar. 21, 1972

[54] RECORD CHANGER

[72] Inventor: Philip Vazzano, Des Plaines, Ill.

[73] Assignee: Warwick Electronics Inc.

[22] Filed: Jan. 15, 1970

[21] Appl. No.: 3,037

[52] U.S. Cl. ....................274/10 S

[51] Int. Cl. ....................G11b 17/04

[58] Field of Search ....................274/10 S

[56] References Cited

UNITED STATES PATENTS

| | | | |
|---|---|---|---|
| 3,201,131 | 8/1965 | Ansar et al. | 274/10 S |
| 3,216,729 | 11/1965 | Bablet | 274/10 S |
| 3,288,471 | 11/1966 | Weedfall | 274/10 S |
| 3,361,428 | 1/1968 | Freier et al. | 274/10 S |

*Primary Examiner*—Leonard Forman
*Assistant Examiner*—Steven L. Stephan
*Attorney*—Hofgren, Wegner, Allen, Stellman & McCord

[57] ABSTRACT

A record changer having mechanism associated with the center spindle thereof for detecting the absence of records in a record stack on the spindle for operating the record changer in a last record shut-off cycle, with the stack detecting mechanism not being sensitive to the weight of a record or records in the record stack. The spindle carries a sensing member movable outwardly of the spindle body for detecting record presence and controls the extent of elevation of an actuating pin, dependent upon the presence or absence of a record, with the particular elevation being used as a signal to control the subsequent operation of the record changer. The spindle is manually operable from the upper end thereof to discharge records of the stack to the turntable when the record changer is not in use.

4 Claims, 13 Drawing Figures

Patented March 21, 1972 3,650,539

7 Sheets-Sheet 1

Inventor:
Philip Vazzano
By Hofgren, Wegner,
Allen, Stellman & McCord
Attys

Patented March 21, 1972 3,650,539

7 Sheets-Sheet 2

Patented March 21, 1972 3,650,539

7 Sheets-Sheet 4

RECORD CHANGER

BACKGROUND OF THE INVENTION

This invention pertains to record changers and, more particularly, to such a record changer having a last record shutoff mechanism operated by detection mechanism associated with the center spindle of the record changer and without any dependency on the weight of records.

Record changers having last record shutoff operation are commonly known in the art wherein an overarm, resting upon a record stack, is permitted to lower to a signal position when there are no further records in the stack and the record changer then detects this positioning of the overarm to cause the last record shutoff operation. Record changers are also known wherein a center spindle supporting the record stack is made weight-responsive, whereby an absence of a certain amount of weight will cause movement of the spindle and this is detected for causing a last record shutoff operation. This is not reliable because record weight is variable. In the mechanism disclosed herein, the last record shutoff mechanism is operated by a detection made at the center spindle and, thus, the overarm is not required and, further, the absence of a record is detected without any reliance upon the weight of records.

SUMMARY

An object of this invention is to provide a new and improved record changer having improved means for providing a last record shutoff operation.

Another object of the invention is to provide a record changer having a center spindle for supporting a stack of records, with a sensing member on the spindle for detecting the presence or absence of records in a record stack, which is operable without dependence upon the weight of records and which causes last record shutoff mechanism to function when the absence of records is detected.

A further object of the invention is to provide a record changer as defined in the preceding paragraph wherein the spindle has a plurality of fingers forming a support for the record stack, with the sensing member located at least a record thickness above the upper level of the fingers, with an actuating pin movable within the body of the spindle. The actuating pin, in its upward movement, first moves the sensing member outwardly to engage against the wall of a record center hole which is held by a diametrically opposite abutment on the spindle which limits the movement of the actuating pin whereby the presence of records is detected. The absence of records permits further outward movement of the sensing member, resulting in further upward movement of the actuating pin to provide a signal to mechanism disposed beneath the spindle which causes the last record shutoff mechanism to operate.

Further objects of the invention are to provide a record changer having a spindle as defined in the preceding paragraphs wherein there are three of the record-supporting fingers formed from an integral piece of material, with the fingers shaped and of a material to be flexible, a tubular member disposed within the cylindrical body of the spindle has the sensing member positioned at the upper end thereof and has a ring engageable with the fingers for camming the fingers inwardly, the inner tubular member is moved upwardly by the actuating pin to cause retraction of the fingers at the same time as the sensing member is urged outwardly, and the sensing member not only detects presence or absence of records, but further functions to hold records immediately above the lowermost record in the stack against downward movement when the fingers are retracted.

DESCRIPTION OF THE PREFERRED EMBODIMENT

Figure 1:
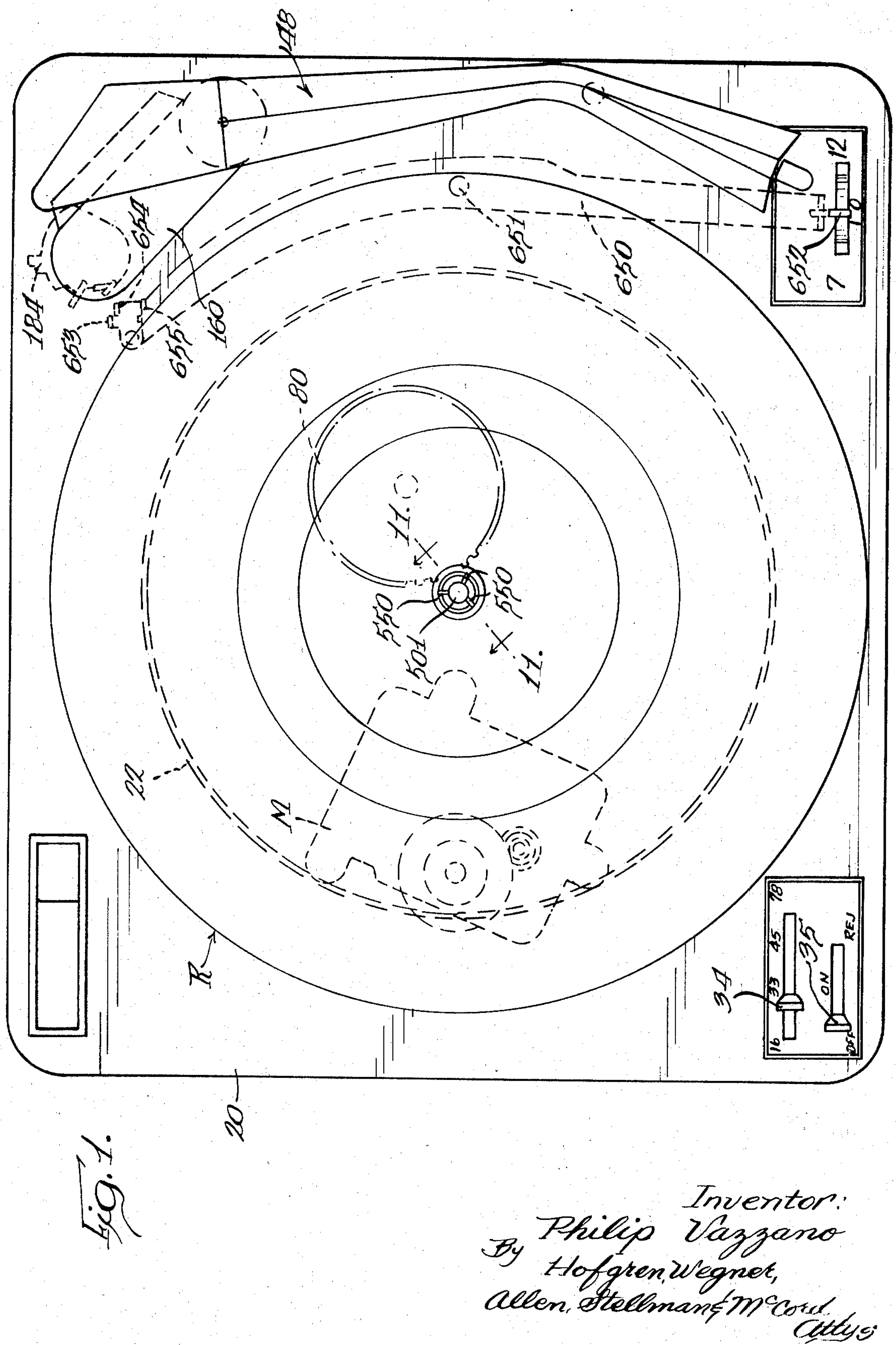
FIG. 1 is a plan view of the record changer.

The record changer is shown generally in FIG. 1 and embodies basically the mechanism shown in Reed et al. U.S. Pat. No. 3,394,938 and reference may be made to said patent for a detailed description of the entire mechanism of the record changer. The novel mechanism disclosed herein relates to modifications to a record changer of the type disclosed in said Reed et al. patent and the same reference numerals have been applied to structure in this application corresponding to that shown in the patent.

The record changer embodies a motorboard 20 on which a turntable 22 is rotatably mounted, with the turntable being driven by a motor M. The speed of rotation of the turntable is controlled by a speed change mechanism associated with the motor, which drivingly engages a peripheral rim on the turntable and which is under the control of a speed selection lever 34. Operation of the changer is controlled by an off-on lever operator 35 which also causes a reject cycle for the record changer.

A housing 160, extending upwardly from a corner of the motorboard, rotatably mounts a tone arm 48 which has up and down movement and also lateral movement to move between positions overlying a record on the turntable and a position outwardly of the turntable.

The record changer is operated through a cycle by 1 revolution of a cycle gear 80 rotatably mounted on the motorboard and driven by a gear 46 rotatable with the turntable once a gear mesh is obtained by operation of a velocity trip mechanism (not shown). The cycle gear, in its revolution, operates a rocker arm (not shown) which, in the course of its movement, carries an actuating pin 154 against a retractor lever 254 pivoted at 248 to the motorboard which operatively engages a setdown lever 204 which is bifurcated and has arms 206 and 208. At the completion of a record change cycle, the retractor lever 254 causes the setdown lever 204 to move to the position shown in FIG. 2 wherein a selector cam 184 is positioned in a counterclockwise rotative position against the urging of a spring 194 through engagement of a lateral arm 218 extending from the set down lever arm 208, engaging a tab 188 on the selector cam. The setdown lever 204 is held in position against the urging of a spring 212. In the course of a record change cycle, the retractor lever is initially withdrawn whereby the springs 194 and 212 can cause movement of the selector cam 184 and the setdown lever 204 under the urging of their springs whereby, in the record changer of the patent, the selector cam 184 can be positioned to detect the size record being moved to the turntable. The setdown lever 204 also has an end 207 coacting with a reject lever (not shown) wherein movement of the reject lever by the setdown lever will cause shutoff of the record changer.

The record change cycle gear 80 carries a pushoff lever 290 pivoted on the gear by a pin 292 and firmly, but yieldably, held in place by a wire spring 294 having a first end hooked about a pin 132 and the other end extending into an opening in the lever 290. This lever functions with mechanism to be described to cause actuation of the spindle of the record changer.

The record changer further embodies an idler retractor lever 332 pivoted to a pin 334 on the motorboard having a downwardly bent end 342 which coacts with a supporting arm for the idler of the turntable drive and in one position of the retractor lever holds the idler away from the rim of the turntable. The retractor lever 332 is shown in position permitting engagement of the idler with the turntable rim in FIG. 2 and is held in this position by an overcenter spring **332*a* connected between a pin 348 on the motorboard and an opening in the retractor lever 332. The retractor lever also has a slot 332*b* receiving a pin 332*c* on the motorboard for limiting the throw of the retractor lever. The downturned end 342 of the retractor lever extends through an opening 334 in the motorboard for engagement with the idler mounting arm of the turntable drive. The positioning of the retractor lever 332 is controlled by a pair of opposed surfaces on a switch shutoff lever which, as this lever moves back and forth, cause alternate positioning of the retractor lever 332. One of these surfaces is shown at 356 and is engageable with a downturned tab 352** on the retractor lever.

The foregoing mechanism is that found in the record changer as disclosed in the patent referred to above, while the novel mechanism, added thereto and substituted for portions thereof, will now be described and for clarity the reference numerals for the additions and modifications begin with reference numeral 501.

Figures 11, 12, 13:
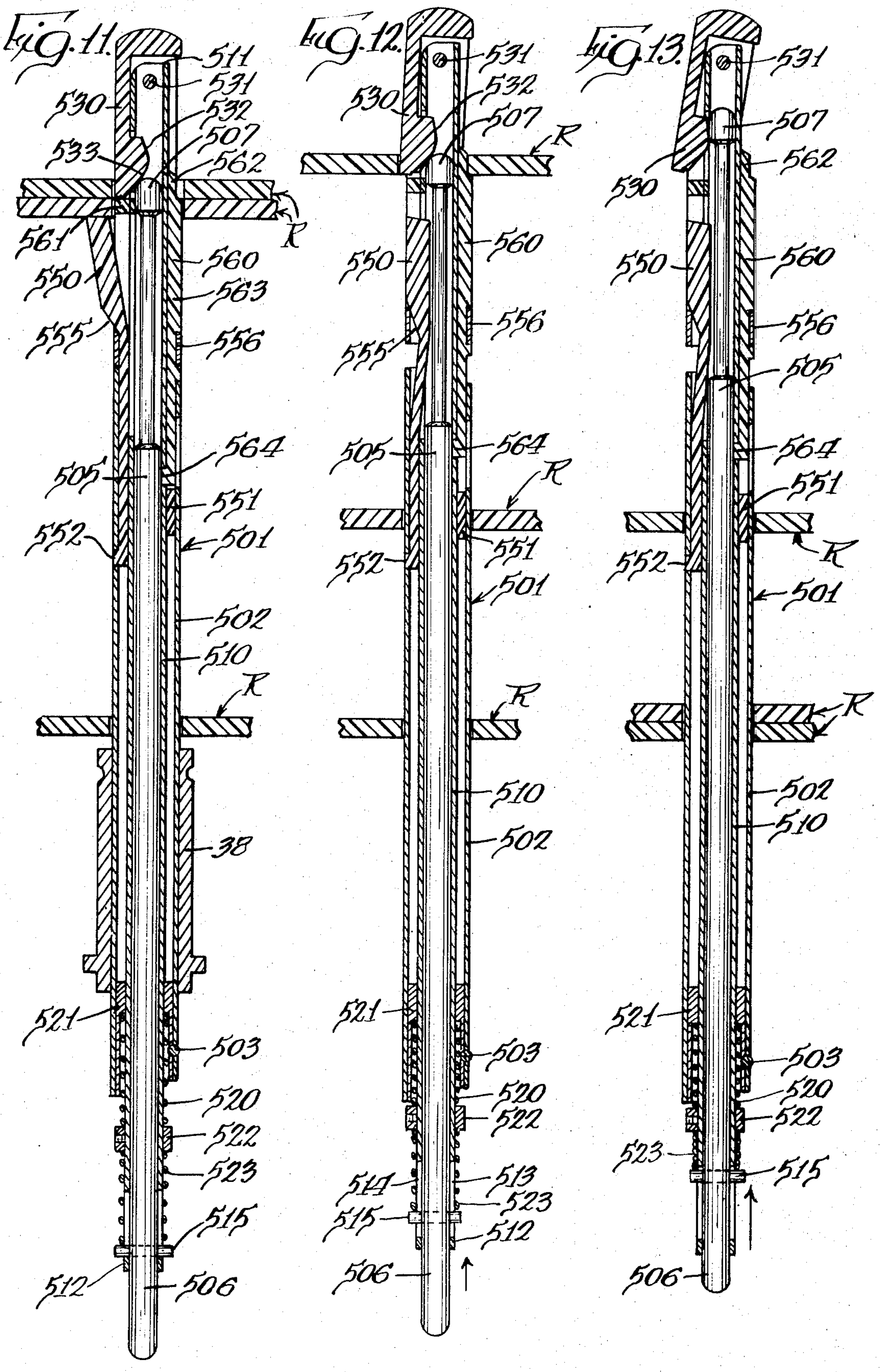
FIG. 11 is a vertical section of the center spindle for the record changer.
FIG. 12 is a view, similar to FIG. 11, showing the positioning of the mechanism of the spindle in a normal cycle when a record remains in the record stack.
FIG. 13 is a similar view showing the positioning of the spindle mechanism when no records are present on the spindle.

The novel mechanism includes a record changer spindle 501, shown specifically in FIGS. 11–13. This spindle includes a body having an outer cylindrical shell 502 fitted through the hub 38 mounting the turntable and removably held in position by a spring wire 503 engageable in a notch at the lower end of the body.

Disposed within the body 502 of the spindle, is an axially extending actuator in the form of a actuator pin 505 having a lower exposed end 506 and an upper end with a cam member 507. This pin is movably mounted within a tubular sleeve 510 having an upper end 511 extending beyond the body and a lower end terminating at 512. The lower end has opposed slots 513 and 514 in which a transverse pin 515 on the actuating pin can move between the ends of the slot. A first spring 520 fits within the lower end of the body 502 and extends between an internal spacer 521 and a collar 522 fixed to the tubular sleeve 510. A second spring 523 extends between the collar 522 and the transverse pin 515 on the actuator pin 506.

The top of the spindle has a cap 530 pivotally mounted to the upper end of the tubular sleeve 510 by a pin 531 with an internal enlargement 532 extending through an opening in the wall of the tubular sleeve 510 and having a cam surface 533 coacting with the cam 507 on the upper end of the actuator pin 506. The cap defines a generally cylindrical configuration for guiding of records being fitted onto the spindle and for guiding records held in a record stack. The cap also functions as a sensing member to sense the presence or absence of at least a single record remaining in the record stack above the lowermost record by movement thereof radially outward of the spindle as caused by upward movement of the actuator pin 506 to move the upper cam end 507 along the inclined cam surface 533 of the cap. This detection stroke is shown with the parts as positioned in FIG. 12 wherein a record R, having its center hole encircling the cap, locks the cap from radially outward movement and, therefore, locks the actuator pin 506 from further upward movement which provides a signal utilized by structure to be described to cause the record changer to continue in normal operation. FIG. 13 shows the action when there are no records in the record stack wherein the cap 530 is pivoted further outwardly at the same time permitting upward movement of the cam 507 which provides a signal that no further records are available for playing and, subsequently, causes turnoff of the record changer. The cap 530 does not sense the bottom record in the stack which will move to the turntable in the change cycle, but actually senses the presence or absence of a record immediately thereabove. This record stack sensing structure is entirely independent of the weight of one or more records on the spindle and is a positive mechanical structure for obtaining the record presence or absence signal. Although there can only be a record stack when records are present, it is believed clear that when reference is made to absence of records "in the record stack" this only defines a record sensing location to distinguish from records on the turntable.

The record stack is supported on the spindle by a plurality of supporting fingers 550, with there being at least three of these fingers to define a plane a record thickness beneath the lower end of cap 530. These fingers are formed of a flexible plastic material having an integral annular collar 551 disposed between the body 502 and the tubular sleeve 510 and locked to the body 502 by outwardly extending tabs 552 fitted in openings in the wall of body 502. Each of the fingers has an outwardly inclined cam surface 555 which coacts with a movable ring 556 whereby elevation of the ring relative to the cam surfaces 555 causes retraction of the fingers 550 from a position to support a record stack whereby the lowest record can be released for movement to the turntable while the remaining records are held by outward urging of the cap 530 which engages the wall of the center hole of a record and tightly holds the lowermost record in position which supports the remaining records in the stack, also.

The ring 556 is carried by a tubular member 560 of relatively rigid plastic having a continuous annular section 561 with an upstanding abutment 562 and a series of downwardly extending legs 563 interfitted between the record supporting fingers 550. At their lower ends, each of the fingers 563 has an inturned tab 564 fitted in an opening in the tubular sleeve 510 whereby the member 560 is locked to the tubular sleeve 510 for movement therewith.

Assuming the first condition as shown in FIG. 11 wherein a plurality of records are in a stack and supported on the plurality of fingers 550, the mechanism to be described will impart lifting movement to the actuator pin 506 to move it to the position shown in FIG. 12. This causes outward movement of the cap 530 to only a slight degree because the record hole also engages the abutment 562. This causes a binding engagement between the cam 507, the cap protrusion 532, the record, and the interior of the tubular sleeve 510. This movement, in effect, connects the tubular sleeve 510 to the actuator pin 506 whereby these parts move upwardly together and carry the member 560 therewith whereby the ring 556 is moved up to cam the support fingers 550 inwardly and a record R is free to move downwardly along the spindle to a turntable. Further into the cycle, the actuator pin 506 will be lowered and as a result the fingers 550 will be free to spring outwardly and support the remaining record stack with the records moving down to the upper ends of fingers as the cap 530 is freed for inward movement as the cam 507 lowers.

In the operation shown in FIG. 13, the actuator pin 506 can move up further relative to the cap 530 since the cap 530 is not blocked from outward movement. In this instance, the transverse pin 515 carried by the actuator pin 506 engages the upper end of the slots 513 and 514 in the tubular sleeve 510 to lift the tubular sleeve 510 until the collar 522 engages the lower end of the body 502.

In the operation shown by FIG. 12, it is the record R blocking the cap 530 which results in upward movement of the tubular sleeve 510 to retract the supporting fingers 550. In FIG. 13, the cap is not restricted against movement, so that it is the function of the transverse pin 515 to raise the tubular sleeve 510 whereby the ring 556 is elevated to retract the supporting fingers 550. The fact that the cap 530 can move further outward without restriction, as shown in FIG. 13, results in the actuator pin 506 moving to a higher level than possible when records are present in the stack and this further movement is used for the signal to indicate the requirement for a subsequent shutoff operation.

The mechanism for actuating the actuator pin 506 of the spindle 501 includes an intermediate lever 600 pivoted to the motorboard at 601 and having a surface 602 engageable in a record change cycle by the pushoff lever 290. An end 603 of this lever engages an upstanding arm 604 (FIG. 3) of a bellcrank pivoted at 605 by a pin to a mounting bracket having side plates 606 and 607 extending downwardly from the motor board 20. A laterally extending arm 608 of the bellcrank has its upper surface engaged against the lower end of the actuator pin 506 of the spindle. An L-shaped arm 609, having upward and lateral sections extends upwardly from the bellcrank and carries an adjustable threaded actuator member 610.

Figure 4:
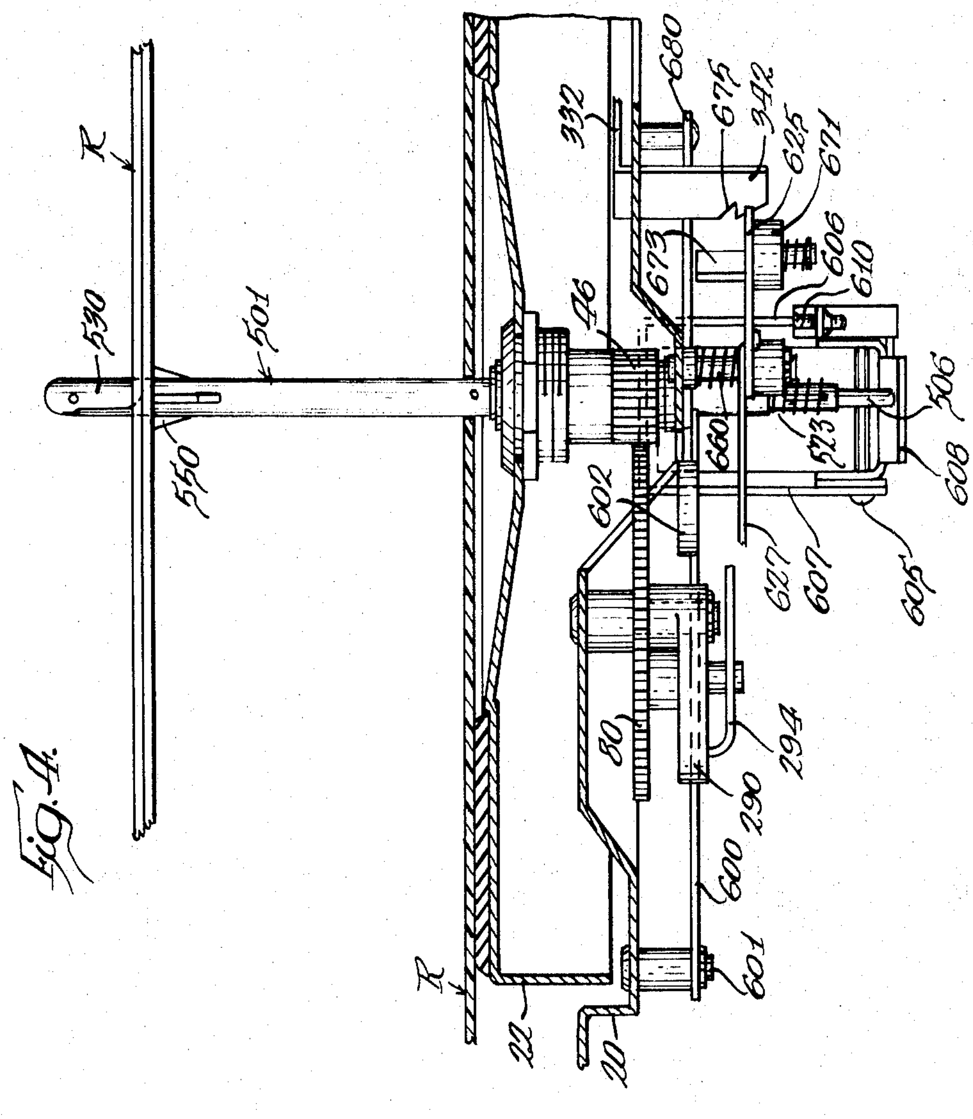
FIG. 4 is a vertical section, taken generally along the line 4—4 in FIG. 2 and again showing the mechanism as positioned during playing of a record.
Figure 3:
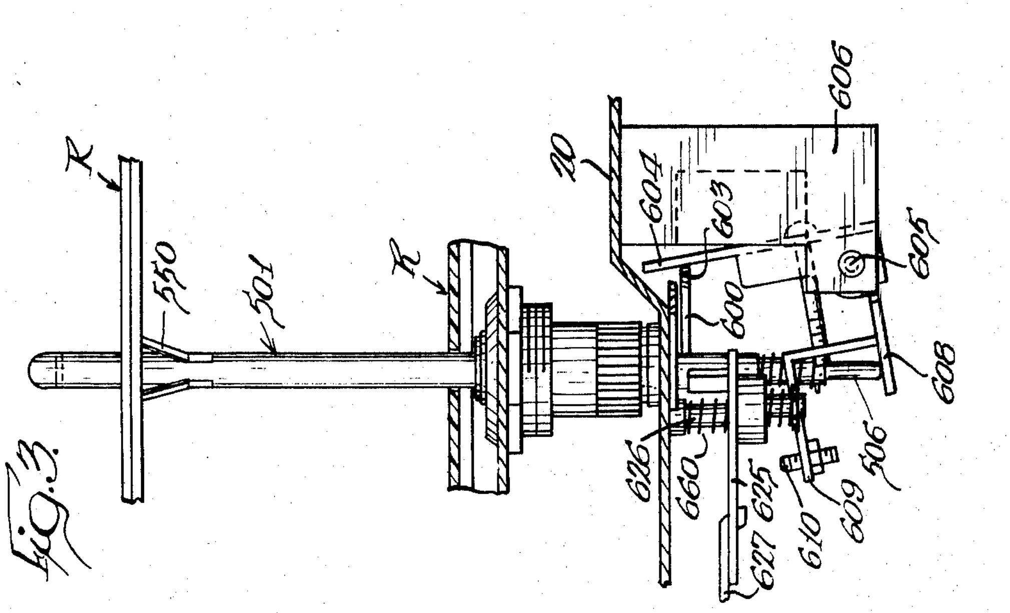
FIG. 3 is a fragmentary vertical section of the changer, taken generally along the line 3—3 in FIG. 2 and showing the mechanism as positioned during the playing of a record.

The parts are shown in a normal at rest position in FIGS. 3 and 4 wherein the bellcrank arm 608 merely rests against the actuator pin 506 of the spindle which is in its lowermost position and the actuator member 610 is spaced from adjacent parts.

Figure 7:
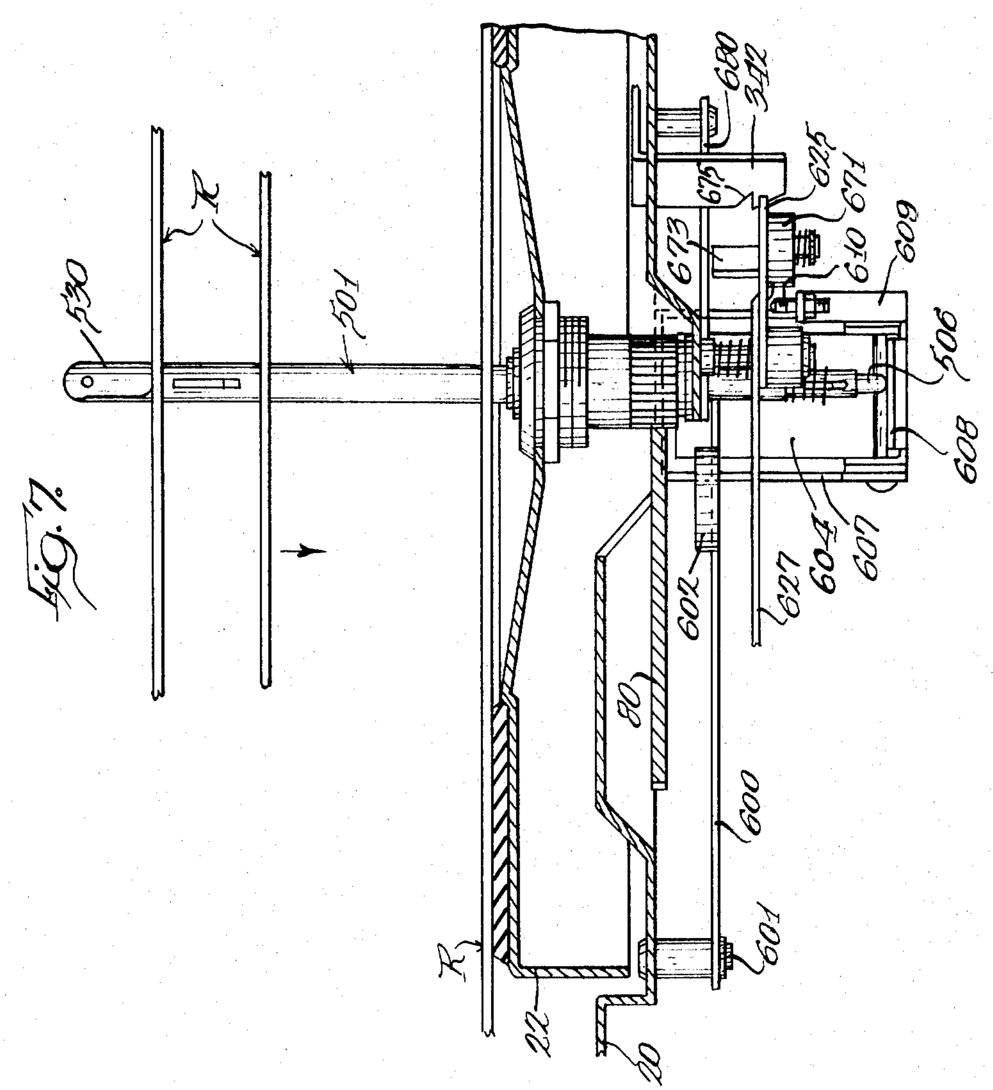
FIG. 7 is a vertical section, taken generally along the line 7—7 in FIG. 5 and showing the mechanism as in the same position as shown in FIG. 6.
Figure 6:
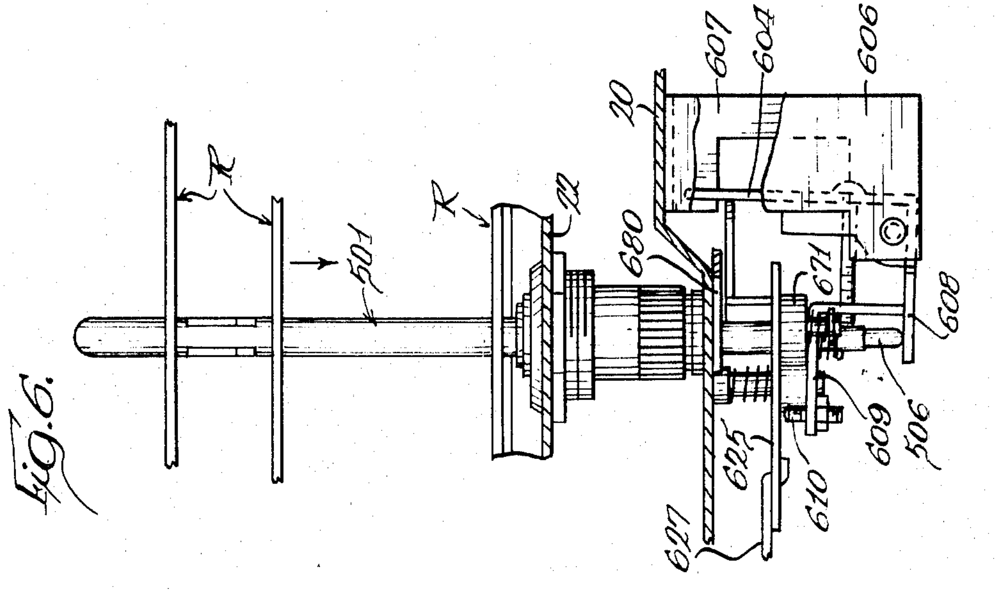
FIG. 6 is a vertical section, taken generally along the line 6—6 in FIG. 5 and showing the position of the apparatus when a record remaining in the record stack has been sensed.

In FIGS. 6 and 7, the intermediate lever 600 has been pivoted during the cycle to slightly pivot the bellcrank and bring the bellcrank arm 608 to a horizontal position, which has elevated the actuator pin 506 to the position shown in FIG. 12. This has permitted one record to move downwardly toward the turntable by retraction of the fingers 550, while a remaining record is held in the stack by outward urging of the cap 530. The actuator member 610 has still not performed any function.

Figures 8, 9, 10:
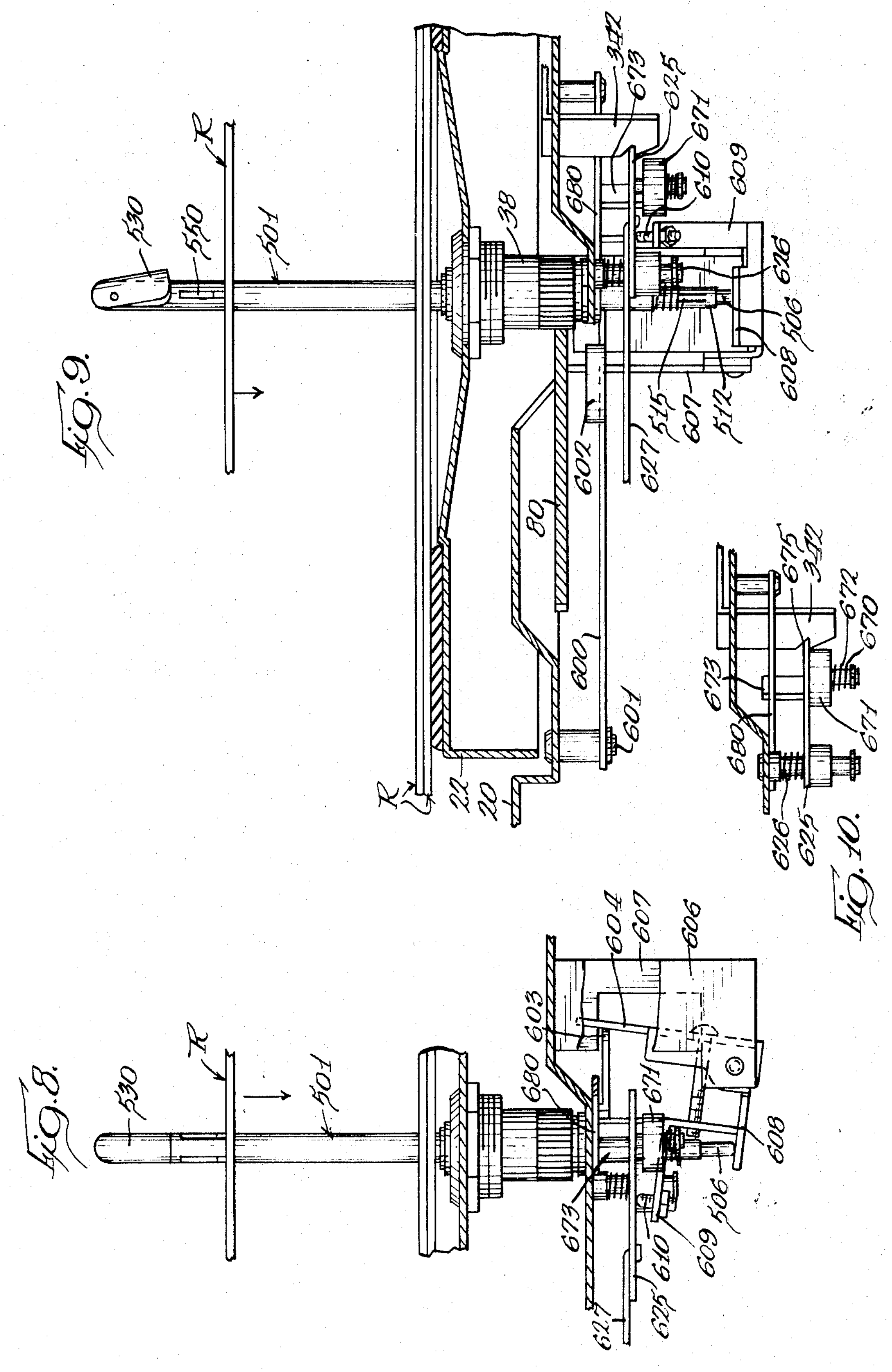
FIG. 8 is a section, similar to FIG. 6, and taken generally along the section line 8—8 in FIG. 5 and showing the mechanism as positioned when the absence of records is sensed.
FIG. 9 is a section, similar to FIG. 7, and showing the mechanism positioned when the absence of a record is sensed and taken generally along the line 9—9 in FIG. 5.
FIG. 10 is a fragmentary view of part of the structure shown in FIG. 9 and in the next record change cycle after sensing wherein part of the mechanism is blocked against movement.

In the positions of the structure shown in FIGS. 8 and 9, the bellcrank has moved even further to upwardly incline the bellcrank arm 608 which has been permitted by further upward movement of the actuator pin 506 of the spindle, as shown in the position of FIG. 13, which has freed a record by retraction of the support fingers 550 and which has further sensed the absence of any further records in the stack by outward movement of the cap 530. The actuator member 610 has now performed a function to be described.

When the actuator pin 506 of the spindle can only rise to the position shown for the spindle in FIG. 12, this means the intermediate lever 600 has not been pivoted through a full stroke and the pushoff lever 290 carried on the gear 80 has yielded because of the spring-urging by spring 294.

The actuator member 610 coacts with a detector disc 625 pivoted to the motorboard by pin 626 and connected by a wire 627 to the selector cam 184.

Figure 5:
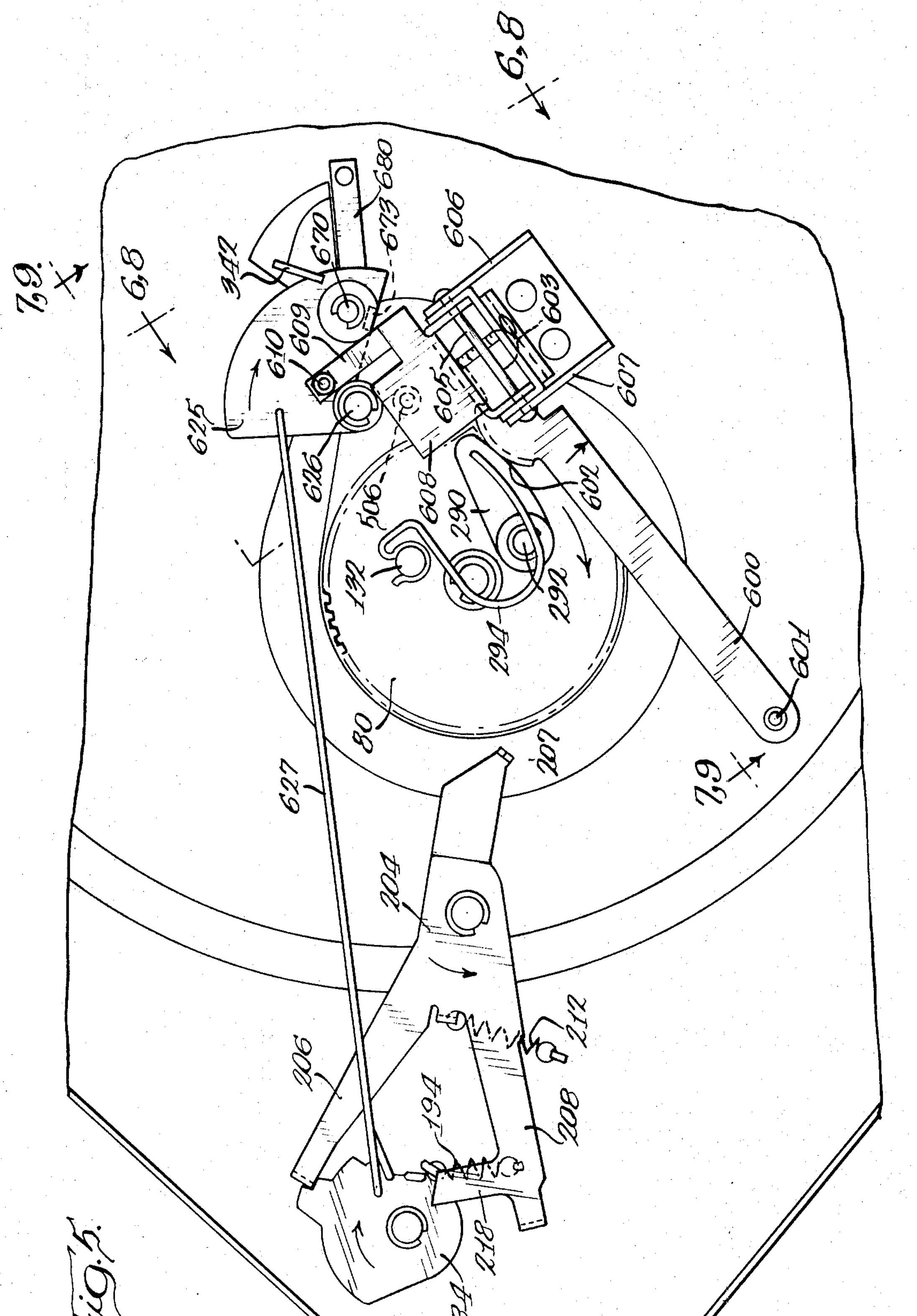
FIG. 5 is a bottom plan view, similar to FIG. 2, and showing the mechanism in record-sensing position.

It should be pointed out that the record changer disclosed herein does not have the record size sense mechanism described in the Reed et al. patent. In the changer disclosed herein, the size of a record to be played is set in by a pivoted lever 650, pivoted to the motorboard at 651, and having three positions controlled by a handle 652 at the front of the record changer and at its opposite end having three steps 653, 654 and 655 which coact with the steps 198, 200 and 202 on the selector cam to control the set-down position for the tone arm. Thus, the steps 653–655 on the lever 650 function to set the selector cam 184 to a desired rotative position, similarly to the function performed by the size sense flag in the mechanism of the Reed et al. patent. The selector cam 184 will rotate a partial revolution in each record changer cycle, under the urging of the spring 194 and as permitted by movement of the setdown lever 204 under control of the retractor lever 254. At the time of ejection or lowering of a record on the center spindle 501, the parts are positioned as shown in FIG. 5 wherein the selector cam 184 has rotated under the urging of the spring 194 in a clockwise direction and through the wire 627 the detector disc 625 has rotated clockwise about its pivot mounting 626 to the position shown in FIG. 5. The detector disc 625 can move vertically on its mounting pin 626 and is urged to a lower position by a coil spring 660 fitted on the mounting pin 626. The detector disc has a downwardly extending pin 670 carrying a ring 671 which is spring-urged against the underside of the detector disc by a spring 672 surrounding the pin 670 and captured by an enlarged end of the pin. The ring has an upstanding locking tab 673 fitted in a notch in an edge of the detector disc to guide the flange against rotation. The downturned flange 342 of the idler retractor lever 332 is provided with a holding notch 675 which coacts with the detector disc 625. The locking tab 673 cooperates with an abutment bracket 680 fixed to the underside of the motorboard.

As stated previously, the parts are shown in an inactive position in FIGS. 3 and 4, while during a record changer cycle and with records in the stack, the parts are shown positioned in FIGS. 6 and 7. In this position, the actuator pin 506 of the spindle has been moved to the position shown in FIG. 12 to cause the operation previously described; however, the actuator member 610 does not contact the detector disc 625 and, therefore, the detector disc is not raised to the level of the notch 675 in the flange 342 of the retractor lever 332. As a result, no signal is stored for last record shutoff operation.

Figure 2:
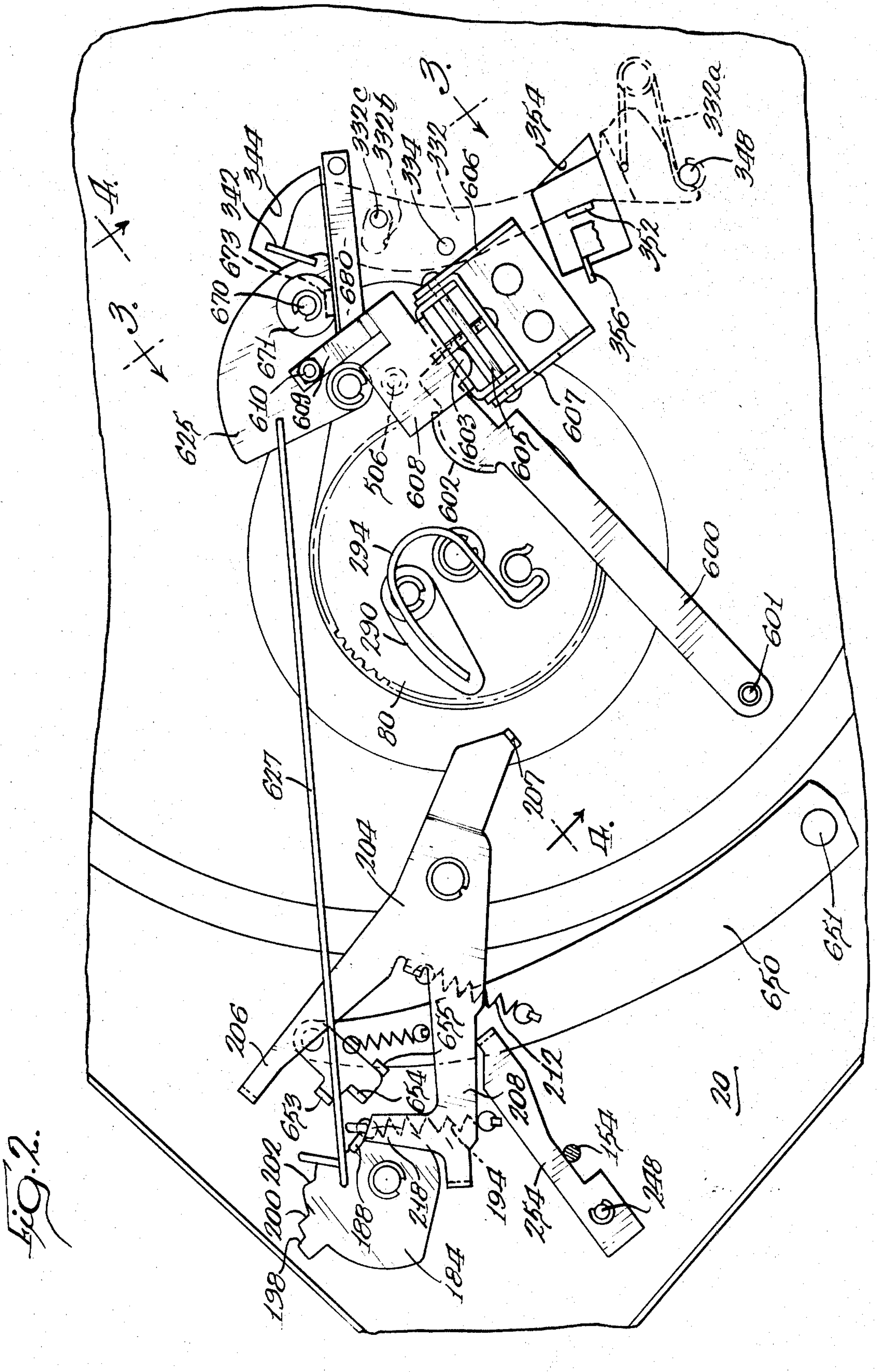
FIG. 2 is a fragmentary bottom plan view of the record changer.

In the position of the parts shown in FIGS. 8 and 9 in a record change cycle, no records remain in the stack and, therefore, the actuator pin 506 of the spindle can move even higher which permits further upward movement of the bellcrank arm 608 which carries the actuator member 610 into engagement with the detector disc 625 and raises it to the level of the retention notch 675 to hold the detector disc elevated. At this particular time in the cycle, the locking tab 673 is beneath the abutment bracket 680 and, thus, the ring 671 yields against the urging of the spring 672 and away from the detector disc 625, as shown in FIGS. 8 and 9. In further movement in the record change cycle, the selector cam 184 rotates counterclockwise, as viewed in FIG. 5, to return the detector disc from the advanced position shown in FIG. 5 to the position shown in FIG. 2. Inasmuch as the detector disc 625 is held in upper position by the notch 675, the ring 671 is free to elevate the locking tab 673 when it moves out from under the abutment bracket 680 and to the position shown in FIG. 10 as caused by urging of the spring 672. The record that is on the turntable is then played to completion and, on the next record change cycle the detector disc 625 is not free to move because of the blocking relation between the locking tab 673 and the abutment bracket 680 whereby through the wire 627 the selector cam 184 is held against movement under the urging of spring 194. Therefore, the setdown lever 204 can move from the position, as shown in FIG. 2, under the urging of spring 212 through and past the position, shown in FIG. 5, wherein the end 207 of the setdown lever coacts with the reject lever (not shown) to snap therebehind, whereby during the completion of the change cycle the pivoting of the setdown lever 204 in a clockwise direction, as viewed in FIG. 5, under urging of retractor lever 254 causes the end 207 of the setdown lever to power the reject lever through its cycle which, as part thereof, shuts off the main switch for the record changer. A further part of this operation is the actuation of the retractor lever 332 to move the drive idler from the turntable rim which moves the retractor lever in a clockwise direction, as viewed in FIG. 2, whereby the flange 342 and the holding notch 675 thereof is moved away from the detector disc 625 which frees the detector disc for lowering movement under the urging of spring 660 to its normal at rest position, as shown in FIG. 3, whereby the record changer is back in the normal at rest condition awaiting turn-on for further operation.

From the foregoing, it will be evident that a record changer has been provided which does not require any overarm for support of a record stack on a spindle and wherein a last record shutoff operation can be accomplished by taking a signal from the spindle, itself, and wherein said signal is not record-weight responsive, but is mechanically responsive to the presence of a record because of lockup of signal mechanism by the wall of the record center hole.

An added feature of the spindle disclosed herein is that manual grasping of the cap 530 and elevation thereof will lift the ring 556 to retract the fingers 550 whereby any records remaining in the stack at the time that the record changer use is to be discontinued can be released for movement to the turntable.

With the structure disclosed herein, the signal detected by the degree to which the actuator pin 506 of the spindle is raised is used to control the record changer. When the actuator pin is permitted to move upwardly the full distance indicating no records are present in the stack, the record changer goes through the completion of the cycle and plays the record that has been lowered to the turntable and, at the completion of its playing, the next record changer cycle commences and the signal that has been stored from the preceding cycle then causes the mechanism to operate to turn off the record changer.

I claim:

1. A center spindle for a record player usable in a generally upright orientation comprising, a hollow body with opposite ends, a tubular member with opposite ends movably mounted in said body and with the opposite ends of the tubular member extending beyond opposite ends of said body, a record-sensing member movably mounted on said tubular member near the upper end thereof, a plurality of fingers mounted on said body with their upper ends at a level a record thickness beneath said sensing member for movement between extended positions to support a record stack and retracted positions to permit passage of a record to a turntable, means carried by said tubular member for retracting said fingers and operative upon movement of the tubular member, a central actuating pin movable in said tubular member, means on said pin for urging the sensing member outwardly in response to upward movement of the pin with the actuating pin operatively connected to said tubular member by interengagement between said pin and sensing member, and an abutment on said tubular member generally diametrically opposite to said sensing member whereby said sensing member in moving to an extended position moves away from said abutment and the sensing member and abutment both engage within a record center hole and hold a record against lowering movement and with said holding of a record maintaining the interengagement between the actuating pin and the sensing member to have upward movement of the actuating pin cause movement of the tubular member to retract said fingers.

2. A center spindle as defined in claim 1 wherein said sensing member is in the form of a cap which is pivotally mounted on the upper end of said tubular member and which is manually engageable and liftable to raise said tubular member and cause operation of the finger retracting means to release the record stack.

3. A center spindle as defined in claim 2 wherein said sensing member has a sloped cam engageable by the actuating pin and with the sloped cam positioned above the actuating pin when the pin is in its lower inactive position whereby said sensing member can be manually lifted without interference from or movement of the actuating pin.

4. A center spindle as defined in claim 1 including means for coupling the actuating pin to said tubular member for retraction of said fingers upon upward movement of the actuating pin and when the sensing member does not engage within a record center hole.

* * * * *